May 24, 1955
J. R. OISHEI
2,708,911
WINDSHIELD CLEANER MOTOR
Filed July 14, 1952
3 Sheets—Sheet 1
FIG. 1.
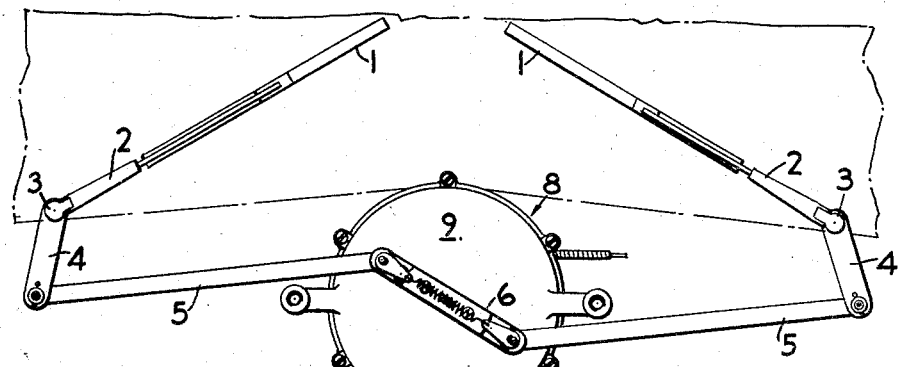
FIG. 2.
FIG. 13.
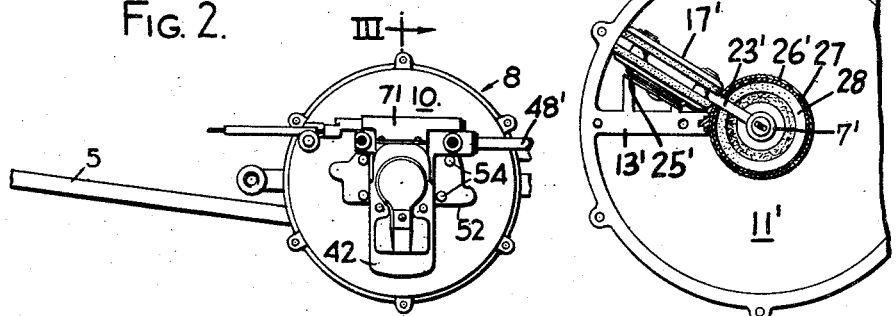
FIG. 6.
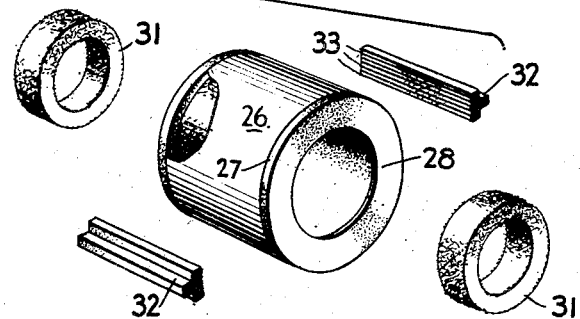
FIG. 7.
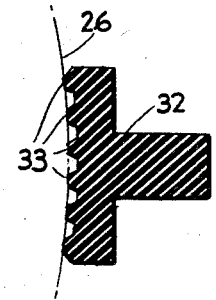
INVENTOR.
John R. Oishei,
BY
Bean, Brooks, Buckley & Bean.
ATTORNEYS

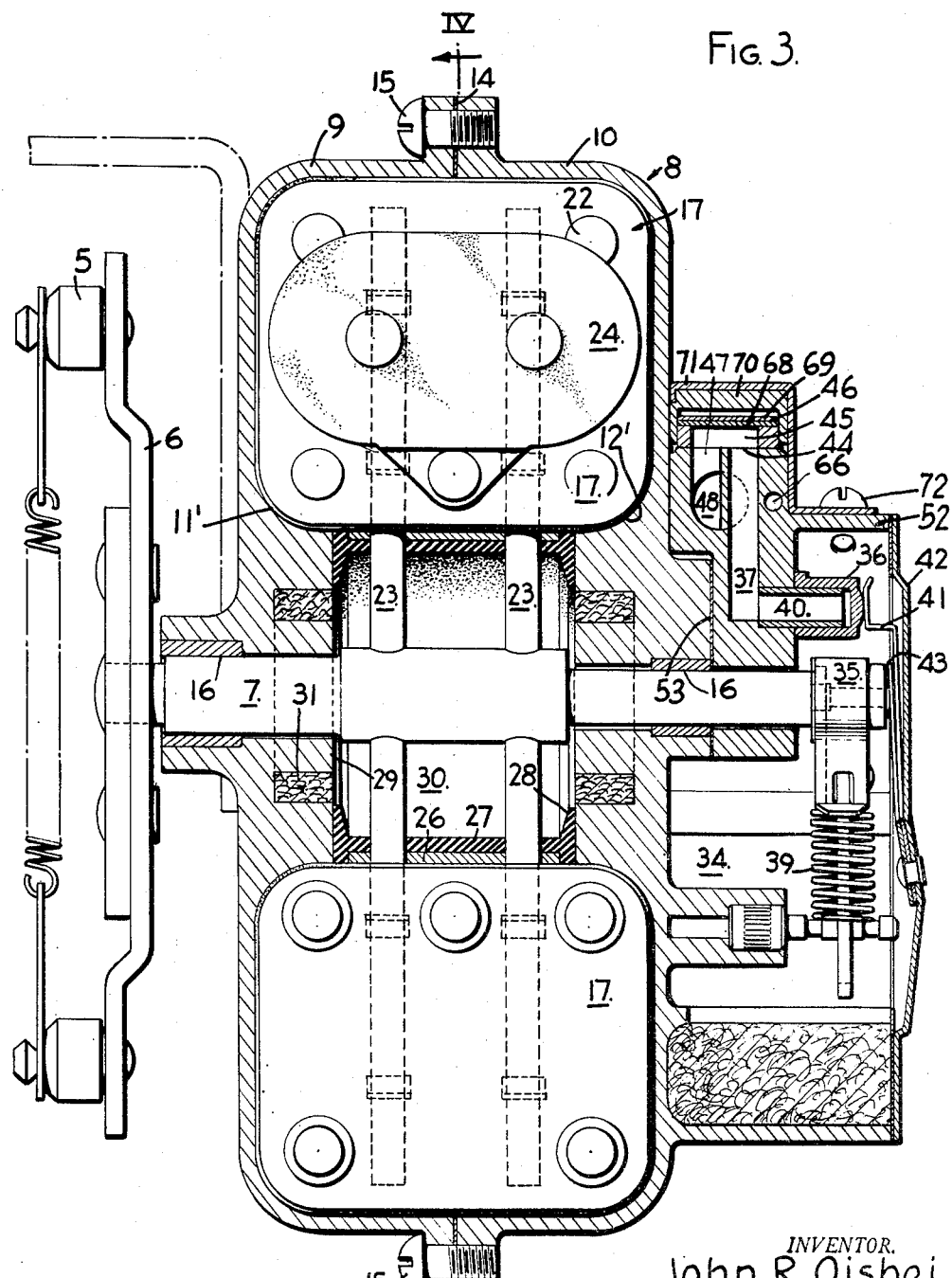

May 24, 1955 J. R. OISHEI 2,708,911
WINDSHIELD CLEANER MOTOR
Filed July 14, 1952 3 Sheets-Sheet 3
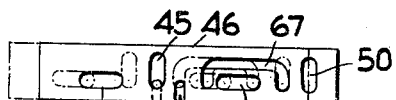
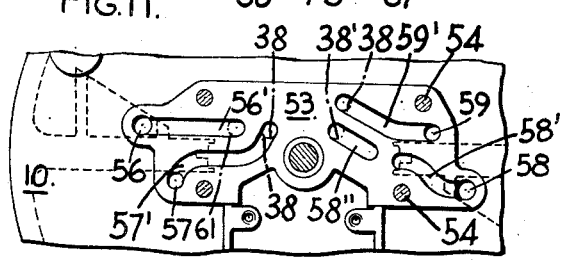
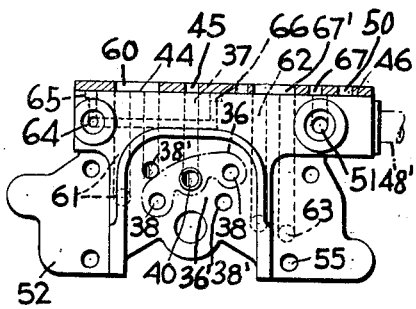
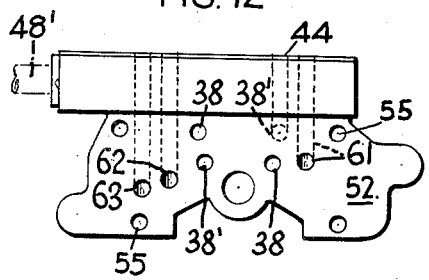
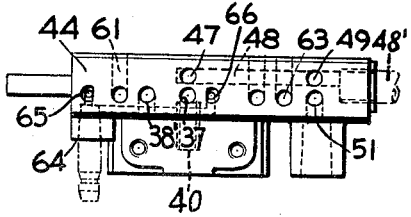
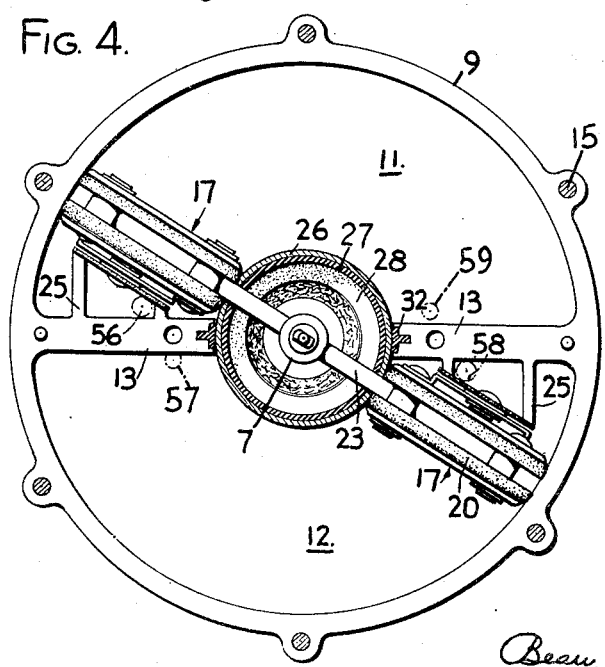
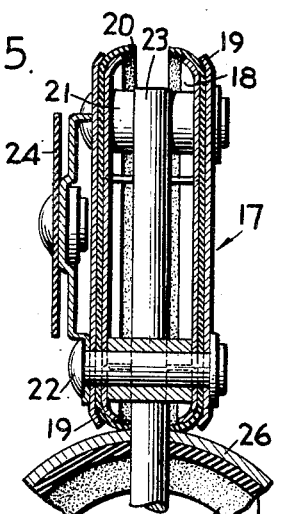
INVENTOR.
John R. Oishei,
BY
Beau, Brooks, Buckley + Beau.
ATTORNEYS.

United States Patent Office 2,708,911
Patented May 24, 1955

2,708,911

WINDSHIELD CLEANER MOTOR

John R. Oishei, Buffalo, N. Y., assignor to Trico Products Corporation, Buffalo, N. Y.

Application July 14, 1952, Serial No. 298,681

12 Claims. (Cl. 121—99)

This invention relates to the fluid motor art and has particular reference to a motor operable preferably from a source of subatmospheric pressure and therefore to one utilizing a low pressure differential, the aim of the invention being to provide a practical suction motor of the vane type of piston that has a wide field of use and is admirably adapted for automotive equipment.

In the past the vane type motor has been proposed for various uses. The earlier developments largely employed fluid under superatmospheric pressure to oscillate the vane piston on the motor shaft, suitable automatic valve mechanism serving to apply the pressure differential first to one side of the piston and then to the other. The lack of a suitable packing in the earlier motors resulted in the leakage of fluid about the piston within the motor chamber and a consequential loss of power.

The advent of the windshield cleaner brought into being a new vane motor which has had widespread and satisfactory use, the same utilizing the pressure difference between that of the outside atmosphere and the low pressure influence of the intake manifold of the vehicle engine. In this development the vane piston was extended to the opposite side of the shaft within the motor chamber to effect a practical air seal for the piston as it oscillated in the specially designed motor chamber that had opposed arcuate portions of different radii. This change in design was at the sacrifice of motive power in that the smaller piston portion worked against the larger portion which reduced the effective area of the motor piston by the amount of the opposed arcuate portion of the smaller radius. Further enlargement of the overall dimension of the motor was necessitated to offset this but even enlargement was restricted because of of the crowded area for accessory installation on the modern automobile. Furthermore, such motor was limited in its angular displacement by the interference of the power producing vane with the housing cavity surface required for the ceiling of the overcenter extension of the vane.

An object of this invention is to provide a fluid motor construction of this type wherein the maximum power output may be obtained by utilizing in a practical manner the torque produced by both portions of the vane and with both portions helping each other instead of working against each other. In accordance with the present invention the motor shaft is sealed by a packing which is responsive to the pressure difference between the pressure inside the motor chamber and the exterior pressure, the sealing being accomplished without any binding gland or load-imposing stuffing box.

A further object of the invention is to provide a vane type motor in which a maximum angular displacement of the oscillating piston is secured just short of a complete circle while maintaining the maximum power output by the elimination of fluid leakage to a practical degree.

The invention also resides in a motor of this type wherein the vane piston is free to follow the guiding confines of the motor chamber walls for ease of operation under a small pressure differential, and again the invention will be found in a multi-vaned motor that produces a balanced application of torque upon the motor shaft during operation and a firm holding of the shaft when the motor is arrested.

Another object of the invention is to provide a wiper motor with connections for dual sources of power. By means of separate conduits, one leading to a power actuated pump, engine driven, to which the wiper motor will respond practically all the time that the vehicle is in motion, and a separate conduit leading from the motor directly to a supplemental source such as the intake manifold of the engine, two separate power sources are tapped. By this means in the event of any failure of the supplemental power actuator, the car engine itself can take over and thus insure the car operator against any loss of power means for driving his windshield wiper at any time as long as the car engine itself is operable. In other words, either one of the two sources will operate the windshield wiper. During the operation of the wiper motor part of the air under certain speed conditions will be drawn into the pump and part of the air will move into the manifold. But some of the air will at all times be drawn into the pump all the time the pump is in operation.

The foregoing and other objects will manifest themselves as the following description progresses wherein reference is made to the accompanying drawings in which Fig. 1 is a front elevational view of the improved fluid motor depicting one of its usages;

Fig. 2 is a rear elevational view of the same with parts removed;

Fig. 3 is a vertical transverse sectional view through the motor as taken about on line 3—3 of Fig. 2;

Fig. 4 is a similar view taken generally along line 4—4 of Fig. 3, with the oscillatory pistons being left in elevation;

Fig. 5 is a fragmentary view depicting one of the pistons in section;

Fig. 6 is an exploded view of the hub packing and lubricating elements.

Fig. 7 is a detailed sectional view through one of the partition packing members;

Fig. 8 is a side elevational view of the valve and face plate assembly;

Fig. 9 is a plan view of the face plate showing the ported valve seat from which the valve has been removed;

Fig. 10 is a similar view of the valve alone;

Fig. 11 is a fragmentary view of the exterior ported pad of the motor casing upon which the face plate seats;

Fig. 12 is a view of the reverse side of the face plate to that shown in Fig. 8; and Fig. 13 is a view similar to Fig. 4 of a single vane motor embodying the invention.

Referring more particularly to the accompanying drawings, the improved motor has been shown, by way of example only, as a power plant for a windshield cleaner, the latter having the windshield wipers 1, their carrying arms 2, the rockshafts 3 on which the arms are fixed, the rocker arms 4 fixed to the shafts, and the link bars 5 that connect the rocker arms to a double throw drive arm 6 on the motor shaft 7.

The fluid motor 8 of the invention is of the oscillatory type and, according to the illustrated embodiment of Figs. 1 through 12, has its casing divided circumferentially on a radial plane to provide two like chambered sections 9 and 10, with mating chamber-forming cavities 11, 12 that are substantially sector shaped and separated one from the other by radial partitions 13. This formation lends itself to die-cast production and when the sections are assembled they are easily sealed by a single annular packing 14 under the clamping pressure of the screws 15. The motor shaft 7, which is journaled in the alined axial bearings 16 concentric to the sector shaped chambers, carries a plurality of radially disposed vanes 17 that constitute oscillatory pistons for operating in the thus formed motor chambers 11, 12. A practical construction for the piston is shown in Fig. 5 and comprises opposed sections each having inner and outer body plates 18, 19 clampingly supporting an interposed cupped packing 20, with the two sections being combined into a rigid piston body by the sustaining spacers 21 and the rivets 22. Bracket arms in the form of rods 23 extend radially from the motor shaft to establish driving connections with the pistons, the latter being free to slide or play in and out as well as laterally on the rods to avoid any binding of the piston on the chamber walls incidental to misalinement between the walls and the shaft bearings, or because of lateral stresses imposed upon the shaft. The rods 23 may be fixed in diametral holes through the shaft and are two in number to provide a balanced support for the floating pistons. Each piston may carry a parking valve 24 that normally engages a parking seat 25 on the partition wall 13 for holding the motor arrested.

For effectively sealing the motor chambers in a practical manner, the motor shaft carries a cylindrical hub-forming shell 26 of a self-sustaining character and through which the rods 23 extend for support. This shell forms the inner peripheral wall of the motor chambers 11 and 12 and in turn provides a support for a soft rubber packing cylinder 27 which is imperforate except where pierced by the rods 23. The shell may be slightly shorter than the packing cylinder and inset in its periphery to provide therewith a smooth peripheral hub surface for sealing contact by the piston packing 20 as well as by the chamber packing strips 32. The opposite end walls of the packing cylinder have annular inwardly extending sealing flanges 28 in sliding engagement with the adjacent end walls 29 of a hub-receiving chamber 30 through and in which latter the rods 23 extend and oscillate. The sealing flanges 28 are responsive to an air pressure differential and therefore they will make sealing contact with the walls 29 to preclude air passage across the end walls from the pressure side of the piston to the suction side thereof. Further, air entering through the shaft bearings will be precluded entrance into the diametrically opposed suction chambers by the annular sealing flanges 28. These annular packing flanges may be attenuated inwardly to make their inner margins more flexible and therefore more responsive to the pressure difference. The hub chamber is of less width than the motor chambers to form the latter with inwardly curved annular shoulders 11' and 12' for supporting the packing flanges of the pistons around the inner corners of the motor chambers to better seal the pistons across the periphery of the hub. These shoulders lead up to raised central portions of the opposed castings 9, 10, in which the shaft bearings are formed. Air leakage along the rods 23 from the hub chamber to the space between the piston sections will provide a pressure differential over that in the fore portions of the motor chambers to act upon the cup flanges for more effectively sealing the pistons. In the illustrated embodiment the sealing flanges 28 are carried by the hub member and have sealing contact against the end walls of the hub chamber but these parts may be reversed so that the pressure responsive sealing flanges are fixed on the end walls of the chamber and seal against end wall portions on the hub member.

Suitable lubricant-holding pads 31 may be inset in the walls 29 inwardly of the annular packing flanges 28 to furnish the necessary lubricant. The packing strips 32 are designed to seal the clearance between the partitions 13 and the periphery of the hub 26, 27 and may be mounted in grooves in the inner ends of the partition walls to present broad hub-engaging faces having ribs 33 to better seal the sliding joint.

The pistons are caused to oscillate in their chambers by a fluid pressure differential as operatively applied through automatic valve mechanism which herein is housed within a valve chamber 34 on the motor section 10. The oscillating motor shaft has one end projecting into the valve chamber to oscillate a kicker cam 35 and therethrough to rock a valve 36 upon a seat 36' for connecting a suction supply port 37 alternately to one or the other of two sets of chamber ports 38 and 38' while uncovering the companion set of ports to the atmosphere. The valve mechanism employs a snap action involving an overcenter spring 39 to rock the valve quickly from one to the other of its two operative positions. Such a snap action is more fully disclosed in copending application Serial No. 69,896. In such earlier construction, as in this, the valve is hung on a tube 40, fixed in the supply port 37, and is yieldably held by a flat spring 41 carried by the cover 42 of the valve chamber. A second flat spring 43 on the cover holds the kicker 35 on the end of the motor shaft for limited rotational play.

The supply port 37 opens through a control valve seat 44 and is designed to be connected by a cross-recess 45 in the control valve 46 to a running port 47 in the seat, which running port is in turn connected by a duct 48 and hose 48' to a primary source of suction, such as a powered pump (not shown). A second running or pump port 49 branches from the duct 48 and opens through the seat 44 for connection by a valve cross-recess 50 to a port 51. This port is intended for connection to an air filter to enable an engine driven pump to draw in atmospheric air for the purpose of crank case ventilation should it be desired. Consequently the cross-recess 50 will connect the ports 49 and 51 when the valve 46 is in its closed or parking position. To facilitate the formation of these ports and passages, a separate piece is made in the form of a face plate 52 for mounting upon a pad 53 on the outside of the casing section 10 where it is secured by suitable fasteners 54 engaged in holes 55. Leading from the pad face into the motor chamber are four chamber ducts 56, 57, 58 and 59, two for each motor chamber at opposite sides of its piston with a corresponding one of each pair opening into the respective chambers through their own parking seats 25.

When operating, the motor is connected to its source of low pressure by placing the control valve in a position wherein the running port 47 is connected by the cross-recess 45 to the supply port 37 from which communication is established alternately by the rockable valve 36 to the opposite sides of the plural vane chambers. In the position of the valve 36 shown in Fig. 8, the suction communication to motor chamber 11 is made through the left chamber port 38 into duct 57, or an extension 57' thereof, while the suction communication to motor chamber 12 is concurrently made through the right chamber port 38 through the duct 59, or an extension 59' thereof. The valve 36, being hollow, connects both chamber ports 38 to the suction port 37. In such position of the rockable valve 36 the chamber ports 38' are uncovered to the atmosphere so that atmospheric air will enter motor chamber 11 through the left chamber port 38', up to the valve seat 44, valve recess 60, passage 61 and into duct 56, or an extension 56' thereof, while atmospheric air will enter motor chamber 12 through the right chamber port 38' into a pad recess 58'', through passage 62, valve recess 67', passage 62 and into duct 58, or an extension 58' thereof. A reversal of the valve 36 will uncover the chamber ports 38 and establish suction communication through the chamber ports 38'.

For parking the wipers, the control valve 46 is moved to the left, Fig. 8, and this has the effect of discontinuing the pump as the source of operating pressure and substituting another source, such as the intake manifold as a source of parking pressure. To this end, a parking connection 64 opens through two parking ports 65 and 66 in the control valve seat 44 which are designed for being connected to the combined operating and parking passages 61 and 63 by the control valve recesses 60 and 67, respectively. Thereby, the suction influence of the intake manifold is continuously applied to the plural pistons through the parking seats and in shunt relation to the automatic valve action. When in its parking position, the control valve 46 opens the suction supply port 37 to the atmosphere through a venting port 73 and thereby permits the relatively higher atmospheric pressure to enter the motor chambers for driving the pistons to their suction-connected parking seats 25.

With the present invention it is possible to provide a motor with a single vane or piston having an arcuate movement of almost a complete circle. In Fig. 13 such a pump is shown wherein the piston 17' is carried by bracket arms 23' and is designed to engage on a parking seat 25'. The automatic valve mechanism will obviously be timed to trip its valve at the end of the piston stroke which could approximate an angular displacement of 300° or thereabouts. This single vane motor is otherwise similar in construction as the previously described dual vane motor in that its single chamber 11' has a partition wall 13' which carries the parking seat. The shaft 7' carries the composite hub member, comprising the soft rubber packing cylinder 27' with its sealing flanges 28' and its sustaining shell 26', upon which the packing strip 32' bears in fluid sealing contact. In this embodiment the bracket rods 23' pierce the hub member only on one side.

The control valve 46 may consist of a plain stamping with its recesses extending therethrough and closed by a plate 68 held down by a flat spring 69 and arranged within a carried slide 70 that is guided by a strap-like housing 71. Screws 72 secure the housing in place.

In both embodiments, the motor chamber is effectively sealed against air leakage, and its piston is enabled to move to a maximum extent. The plural vaned motor is productive of greater power, such added power being assured by reason of the efficient sealing of the motor against pressure leakage. The annular packing flanges about the central hub area preclude the passage of air from the aft chamber portion to the fore chamber portion, the annular flanges responding to the higher pressure in the hub chamber pressure and that in the fore chamber portion. Because of its practical construction, the motor will operate on a very small vacuum so that it will provide satisfactory performance.

The foregoing description has been given in detail for clarity and without thought of limitation since the inventive principles involved are capable of assuming other physical embodiments without departing from the spirit of the invention and the scope of the appended claims.

What is claimed is:

1. A suction operated motor comprising a casing having a shaft bearing and a coaxially related motor chamber having inner and outer concentric peripheral walls, a shaft journaled in the bearing, a piston within the chamber spaced radially outward from the shaft, a piston-supporting member extending radially from the shaft, the inner peripheral wall being circumferentially divided to receive the piston-supporting member for oscillatory movement, and an imperforate cylindrical closure for the divided inner wall connected to said supporting member and having on its opposite ends pressure responsive sealing flanges slidably engaging the opposed portions of the divided casing wall inwardly from the inner wall in response to a pressure differential between the inside and outside pressures to preclude air leakage into the chamber.

2. A plural vane motor having a casing with sector-shaped chambers opening into a centrally arranged hub-receiving chamber, a drive shaft journaled in the opposite ends of the hub chamber and having an enlarged hub forming the inner walls of the sector-shaped chambers, plural vanes radially positioned and circumferentially spaced about the hub and oscillatable within the sector-shaped chambers, the hub chamber and the hub having opposed end walls about the shaft, and a sealing ring interposed between each end wall of the hub chamber and its adjacent end wall of the hub, said sealing ring being flexible and responsive to a fluid pressure differential to preclude the passage of fluid from the hub chamber to lower pressure areas in the sector-shaped chambers.

3. A plural vane motor having a casing with sector-shaped chambers arranged about and opening into a co-axially arranged hub-receiving chamber, a drive shaft journaled in the hub chamber and carrying an enlarged hub formation forming the inner side walls of the sector-shaped chambers, plural vanes radially positioned about the hub formation and oscillatable within the sector-shaped chambers, the hub chamber as well as the hub formation having opposing shaft encircling wall portions, one wall portion at each end of the hub formation and its hub chamber having a shaft encircling pressure responsive flexible flange extending inwardly and seating upon the adjacent opposing wall portion to seal the sector-shaped chambers against air passage thereinto from the hub chamber.

4. A vane-type suction motor comprising a casing, a shaft journaled therein, the casing having an arcuate chamber coaxial with the shaft and also a coaxial hub chamber, an oscillatory vane piston in the chamber fixed to the shaft for back and forth movement therewith but movable relative thereto in a radial plane, a hub fixed on the shaft within the hub chamber, and an annular sealing flange about the shaft between each end wall portion of the hub and opposing portions of the casing, said annular flange being anchored to one wall portion and bearing upon the other wall portion under the urge of the pressure differential to seal the chamber from the interchange of fluid from either chamber side to the other.

5. A fluid motor having a casing with a shaft bearing and a concentrically related arcuate motor chamber, a shaft journaled in the bearing and carrying a piston for oscillatory movement in the motor chamber, and a flexible packing cylinder about the shaft having an inwardly extending annular flange at each end responsive to a fluid pressure differential for sealing contact with the adjacent wall of the casing between the shaft bearing and the motor chamber.

6. A fluid motor comprising a casing having a shaft bearing and an arcuate motor chamber concentrically disposed about the bearing and joined thereto by an interposed hub chamber, a shaft journaled in the bearing and having a radial bracket part projecting out through the hub chamber into the motor chamber, a hub member arranged about the shaft within the hub chamber, an annular sealing flange on each end of the hub member having sliding contact on the adjacent end wall of the hub chamber and being flexible for pressure responsive seal thereon, and a piston carried by the projecting bracket part within the motor chamber.

7. A fluid motor comprising a casing having a shaft bearing and an arcuate motor chamber concentrically disposed thereabout and joined thereto by an interposed hub chamber, a shaft journaled in the bearing and having a radial bracket part projecting out between the opposite end walls of the hub chamber into the motor chamber, a hub member carried by the shaft within the hub chamber, a sealing flange located between each end wall of the hub member and the adjacent chamber wall and having a margin extending freely from one wall for pressure responsive seal upon the other wall and a piston carried by the projecting bracket part within the motor chamber, said bracket part piercing the hub member, and said piston having opposed cupped packings seating on the hub member at opposite sides of the bracket part.

8. A fluid motor comprising a casing having a shaft bearing and an arcuate motor chamber concentric thereabout and joined thereto by an interposed hub chamber, a shaft journaled in the bearing and having a radial bracket part projecting out between the opposite end walls of the hub chamber into the motor chamber, an elastic hub member arranged about the shaft and within the hub chamber, sealing flanges between each end wall of the elastic hub member and the adjacent chamber wall and extending freely from one wall for pressure responsive seal upon the other wall, a self-sustaining cylinder set in flush with the periphery of the elastic cylinder, packing members at the opposite sides of the motor chamber riding on the self-sustaining cylinder to seal its clearance with the casing, and a piston carried by the projecting bracket part within the motor chamber, said bracket part piercing the hub member and its self-sustaining cylinder, and said piston having opposed cupped packings seating on the hub member at opposite sides of the bracket part.

9. A fluid motor comprising a casing having a shaft bearing and an arcuate chamber concentric thereabout, a shaft journaled in the bearing and having a radial bracket part, a piston in the chamber slidable upon the bracket part for play in a radial plane, and a hub member fixed on the shaft and having flexible sealing flanges thereabout responsive to a fluid pressure differential between the internal and external pressures in effecting a sliding contact with the casing against air leakage into the chamber.

10. A fluid motor comprising a casing having spaced axially alined bearings and divided on a medial transverse plane at right angles to the shaft bearings to provide two cupped sections each having a partition wall, packing members clamped between the cupped sections to form a motor chamber, a shaft journaled in the bearings, each cupped section having a substantially annular flat sealing face lying in a plane transverse of the shaft, a hub member carried by the shaft and having on each end an annular sealing flange about the shaft and in sliding contact with a respective one of the flat sealing faces, each flange extending inwardly over its related flat sealing face for fluid pressure responsive movement thereagainst to effect an air tight seal thereon, and an oscillatory piston carried by the shaft and operable in the chambers, and valve means operatively applying differential pressure to the piston simultaneously.

11. A fluid motor comprising a casing having a shaft bearing and an arcuate motor chamber concentric thereabout and joined thereto by an interposed hub chamber having opposite end walls, a shaft journaled in the bearing and having a radial bracket part projecting out between the opposite end walls of the hub chamber into the motor chamber, a hub member arranged about the shaft and within the hub chamber, substantially annular flexible sealing flanges carried by each end of the hub member and extending freely inwardly in pressure responsive seal upon the respective one of the opposite end walls of the hub chamber, a self-sustaining cylinder set in flush with the periphery of the elastic cylinder, fixed packing means at the opposite ends of the arcuate motor chamber riding on the self-sustaining cylinder to seal its clearance with the casing, and a piston carried by the projecting bracket part within the motor chamber, said bracket part piercing the hub member and its self-sustaining cylinder, and said piston having opposed cupped packings seating on the hub member at opposite sides of the bracket part.

12. A fluid motor having a casing with a shaft bearing and a concentrically related arcuate motor chamber, a shaft journaled in the bearing and carrying a piston for oscillatory movement in the motor chamber, and a flexible packing cylinder about the shaft having an inwardly extending annular flange at each end responsive to a fluid pressure differential for sealing contact with the adjacent wall of the casing between the shaft bearing and the motor chamber, said shaft having a radial bracket part projecting through the packing cylinder to support the piston, and said piston having opposed cup packings with marginal flanges turned inwardly toward each other and having sealing contact with the motor chamber wall, said marginal flanges also having sealing contact with the packing cylinder at opposite sides of the bracket part.

References Cited in the file of this patent

UNITED STATES PATENTS

| | | |
|---|---|---|
| 514,295 | Wennberg | Feb. 6, 1894 |
| 1,644,564 | Bullington | Oct. 4, 1927 |
| 1,674,056 | Oishei et al. | June 19, 1928 |
| 2,154,315 | Moraway | Apr. 11, 1939 |
| 2,298,734 | Buchmann | Oct. 13, 1942 |
| 2,316,316 | Coffey | Apr. 13, 1943 |

FOREIGN PATENTS

| | | |
|---|---|---|
| 74,580 | Sweden | June 21, 1932 |